(12) United States Patent
Tsuneki et al.

(10) Patent No.: US 9,933,759 B2
(45) Date of Patent: Apr. 3, 2018

(54) SERVO CONTROL APPARATUS, SERVO CONTROL METHOD, AND NON-TRANSITORY COMPUTER-READABLE MEDIUM, WITH FILTER ADDED TO PROPORTIONAL TERM CALCULATED AT HIGH SPEED

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/492,448

(22) Filed: Apr. 20, 2017

(65) Prior Publication Data

US 2017/0315513 A1 Nov. 2, 2017

(30) Foreign Application Priority Data

Apr. 28, 2016 (JP) ................................. 2016-091323

(51) Int. Cl.
 *G05B 19/18* (2006.01)
 *G05B 11/42* (2006.01)
(52) U.S. Cl.
 CPC .................... *G05B 11/42* (2013.01)
(58) Field of Classification Search
 CPC ...... G05B 19/416; G05B 11/011; G05B 11/42
 USPC ........................................................ 318/569
 See application file for complete search history.

(56) References Cited

U.S. PATENT DOCUMENTS

| 6,351,441 | B1* | 2/2002 | Andoh | G11B 19/04 369/53.3 |
| 2004/0145333 | A1* | 7/2004 | Toyozawa | G05B 19/19 318/632 |
| 2006/0012326 | A1* | 1/2006 | Iwashita | B30B 15/0094 318/645 |
| 2008/0180052 | A1* | 7/2008 | Iwashita | G05B 19/19 318/615 |
| 2013/0138236 | A1* | 5/2013 | Nagaoka | G05B 19/19 700/108 |

(Continued)

FOREIGN PATENT DOCUMENTS

JP 2006-296055 10/2006

*Primary Examiner* — Bentsu Ro
*Assistant Examiner* — Gabriel Agared
(74) *Attorney, Agent, or Firm* — Wenderoth, Lind & Ponack, L.L.P.

(57) ABSTRACT

A servo control apparatus includes a subtractor configured to calculate a difference between a first command value for controlling a servo motor, and a first detection value from the servo motor; an integral term creation unit configured to create an integral term based on an output of the subtractor; an internal division processing unit configured to internally divide the first command value; a subtractor configured to calculate a difference between an output of the internal division processing unit and the first detection value; a proportional term creation unit configured to create a proportional term based on the subtractor; and a adder configured to add an output of the integral term creation unit and an output of the proportional term creation unit, in which a calculation period calculated by the proportional term creation unit is shorter than a calculation period calculated by the integral term creation unit.

8 Claims, 12 Drawing Sheets

(56) References Cited

U.S. PATENT DOCUMENTS

| | | | | |
|---|---|---|---|---|
| 2014/0327383 A1* | 11/2014 | Turner | ............... | G01G 11/043 318/490 |
| 2014/0371899 A1* | 12/2014 | Nagaoka | ............. | G05B 19/404 700/170 |
| 2016/0209829 A1* | 7/2016 | Nakamura | ........... | G05B 19/404 |

* cited by examiner

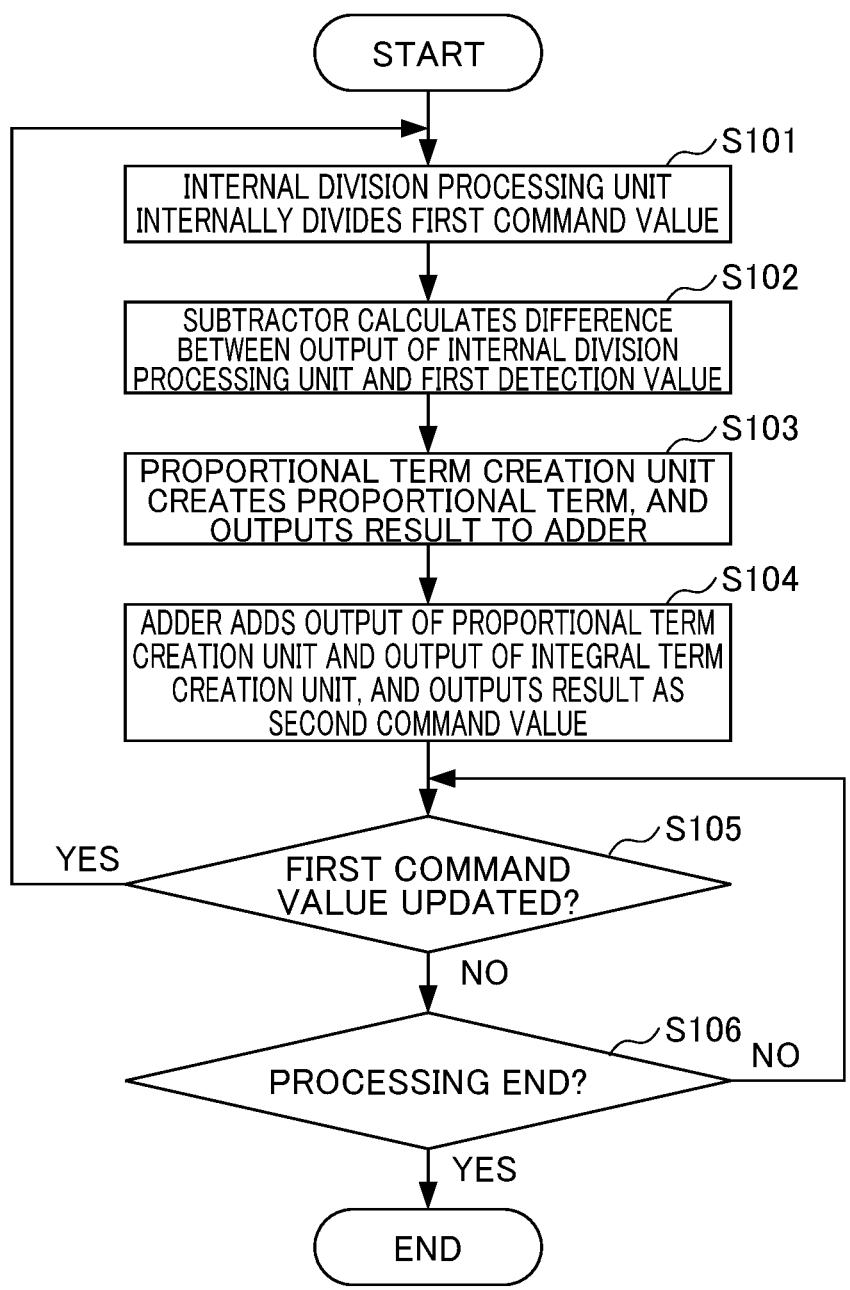

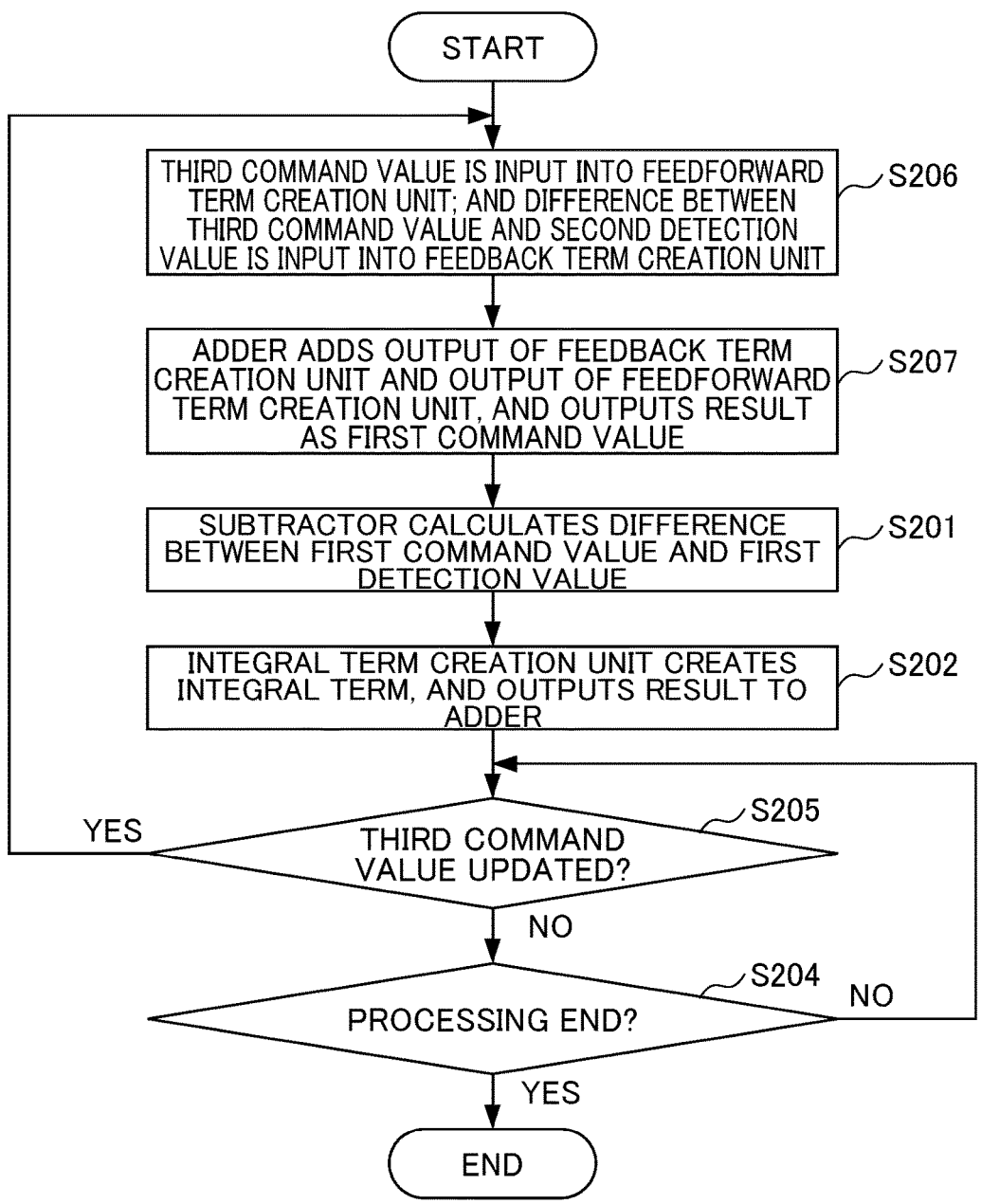

SERVO CONTROL APPARATUS, SERVO CONTROL METHOD, AND NON-TRANSITORY COMPUTER-READABLE MEDIUM, WITH FILTER ADDED TO PROPORTIONAL TERM CALCULATED AT HIGH SPEED

This application is based on and claims the benefit of priority from Japanese Patent Application No. 2016-091323, filed on 28 Apr. 2016, the content of which is incorporated herein by reference.

BACKGROUND OF THE INVENTION

Field of the Invention

The present invention relates to a servo control apparatus, a servo control method, and a non-transitory computer-readable medium, in which a filter is added to a proportional term calculated at a high speed; and in particular, the present invention relates a servo control apparatus, a servo control method, and a non-transitory computer-readable medium, all of which are preferably used for performing current control of a servo motor.

Related Art

In relation to a servo control apparatus in which a filter is added to a proportional term, for example, Patent Document 1 discloses a servo control apparatus which performs current control of a load such as an electric motor. This servo control apparatus includes: a low-speed arithmetic logical unit which performs one calculation in each predetermined period, and calculates a voltage command integral term by performing integral control arithmetic processing based on a current error between a current command value and a current output value; and a high-speed arithmetic logical unit which performs one calculation in each period that is shorter than the period of the low-speed arithmetic logical unit, calculates a voltage command proportional term by performing proportional control arithmetic processing based on the current error, and creates a voltage command value by adding the voltage command integral term and the voltage command proportional term.

Patent Document 1: Japanese Unexamined Patent Application, Publication No. 2006-296055 (Abstract, FIG. 1, etc.)

SUMMARY OF THE INVENTION

In the above-described servo control apparatus, a period for processing the proportional term differs from the period for updating the first command value (corresponding to, for example, the current command value) which is input into the servo control apparatus; therefore, the second command value (corresponding to, for example, the voltage command value) which is output from the servo control apparatus, is largest immediately after changing the first command value when the speed deviation is greatest, and will diminish until the next first command value is changed. Therefore, the second command value oscillates depending on the update period of the first command value.

An object of the present invention is to provide a servo control apparatus, a servo control method, and a non-transitory computer-readable medium, all of which can suppress oscillations of a command value which is output from the servo control apparatus for controlling a servo motor.

(1) A servo control apparatus according to a first aspect of the present invention includes: a first subtractor (e.g., subtractor 1-1 to be described later) configured to calculate a difference between a first command value being a periodic signal for controlling a servo motor, and a first detection value from the servo motor; an integral term creation unit (e.g., integral term creation unit 2 to be described later) configured to create an integral term by integrating an output of the first subtractor, and multiplying an integral value thereof by a first coefficient; an internal division processing unit (e.g., internal division processing unit 5 to be described later) configured to internally divide the first command value by a predetermined period; a second subtractor (e.g., subtractor 1-2 to be described later) configured to calculate a difference between an output of the internal division processing unit and the first detection value; a proportional term creation unit (e.g., proportional term creation unit 3 to be described later) configured to create a proportional term by multiplying an output of the second subtractor by a second coefficient; and a first adder (e.g., adder 4 to be described later) configured to add an output of the integral term creation unit and an output of the proportional term creation unit, and configured to output an additional value thereof as a second command value for controlling the servo motor, in which a calculation period calculated by way of the proportional term creation unit is shorter than a calculation period calculated by way of the integral term creation unit.

(2) In the servo control apparatus of a second aspect according to the first aspect, the internal division processing unit may divide a quantity, which has been changed in an update period of the first command value, by a calculation period calculated by way of the proportional term creation unit.

(3) The servo control apparatus of a third aspect according to the first or second aspect may further include: a feedforward term creation unit (e.g., feedforward term creation unit 6 to be described later) configured to create a feedforward term by differentiating a third command value for controlling the servo motor, and multiplying a differential value thereof by a third coefficient; a third subtractor (e.g., subtractor 7 to be described later) configured to calculate a difference between the third command value and a second detection value from the servo motor; a feedback term creation unit (e.g., feedback term creation unit 8 to be described later) configured to create a feedback term from an output of the third subtractor; a timing adjustment unit (e.g., timing adjustment unit 10 to be described later) configured to adjust timing of an output of the feedforward term creation unit; a second adder (e.g., adder 9-1 to be described later) configured to add an output of the feedforward term creation unit and an output of the feedback term creation unit, and configured to output an additional value thereof as the first command value to the first subtractor; and a third adder (e.g., adder 9-2 to be described later) configured to add an output of the timing adjustment unit and an output of the feedback term creation unit, and configured to output an additional value thereof as the first command value being timing-adjusted to the internal division processing unit.

(4) In the servo control apparatus of a fourth aspect according to the third aspect, the timing adjustment unit may advance timing by a quantity of delay in the internal division processing unit.

(5) In the servo control apparatus of a fifth aspect according to the third or fourth aspect, the first command value and the first command value being timing-adjusted may be speed command values, the first detection value may be a speed detection value, the second command value may be a current command value, the third command value may be a position command value, and the second detection value may be a position detection value.

(6) A servo control method for a servo control apparatus according to a sixth aspect of the present invention includes: calculating a first difference between a first command value being a periodic signal for controlling a servo motor, and a first detection value from the servo motor; creating an integral term by integrating the first difference, and multiplying an integral value thereof by a first coefficient; internally dividing the first command value by a predetermined period; calculating a second difference between the value internally divided and the first detection value; creating a proportional term by multiplying the second difference by a second coefficient; and adding the integral term and the proportional term, and outputting an additional value thereof as a second command value for controlling the servo motor, in which a calculation period for calculating the proportional term is shorter than a calculation period for calculating the integral term.

(7) The servo control method of a seventh aspect according to the sixth aspect may include: creating a feedforward term by differentiating a third command value for controlling the servo motor, and multiplying a differential value thereof by a third coefficient; calculating a third difference between the third command value and a second detection value from the servo motor; creating a feedback term from the third difference; adjusting timing of the feedforward term; adding the feedforward term and the feedback term, and outputting an additional value thereof as the first command value; and adding the feedforward term being timing-adjusted and the feedback term, and outputting an additional value thereof as the first command value being timing-adjusted.

(8) A non-transitory computer-readable medium according to an eighth aspect of the present invention is a non-transitory computer-readable medium storing a servo control program causing a computer as a servo control apparatus to execute the servo control method according to the present invention.

According to the present invention, a first command value for controlling a servo control apparatus is internally divided by a predetermined period, whereby oscillations of a second command value, which is output from the servo control apparatus for controlling a servo motor, can be suppressed.

BRIEF DESCRIPTION OF THE DRAWINGS

FIG. 2A is a flowchart illustrating an operation of the servo control apparatus of the first embodiment;

FIG. 6 is a flowchart illustrating an operation of the servo control apparatus of the second embodiment;

DETAILED DESCRIPTION OF THE INVENTION

Embodiments of the present invention are hereinafter described in detail with reference to the drawings. Prior to describing the embodiments of the present invention, technologies serving as the premise to arrive at a servo control apparatus according to the present invention are described. In the following descriptions of first and second premise technologies, a servo control apparatus for a servo motor is described as a typical example.

First Premise Technology

Figure 10:
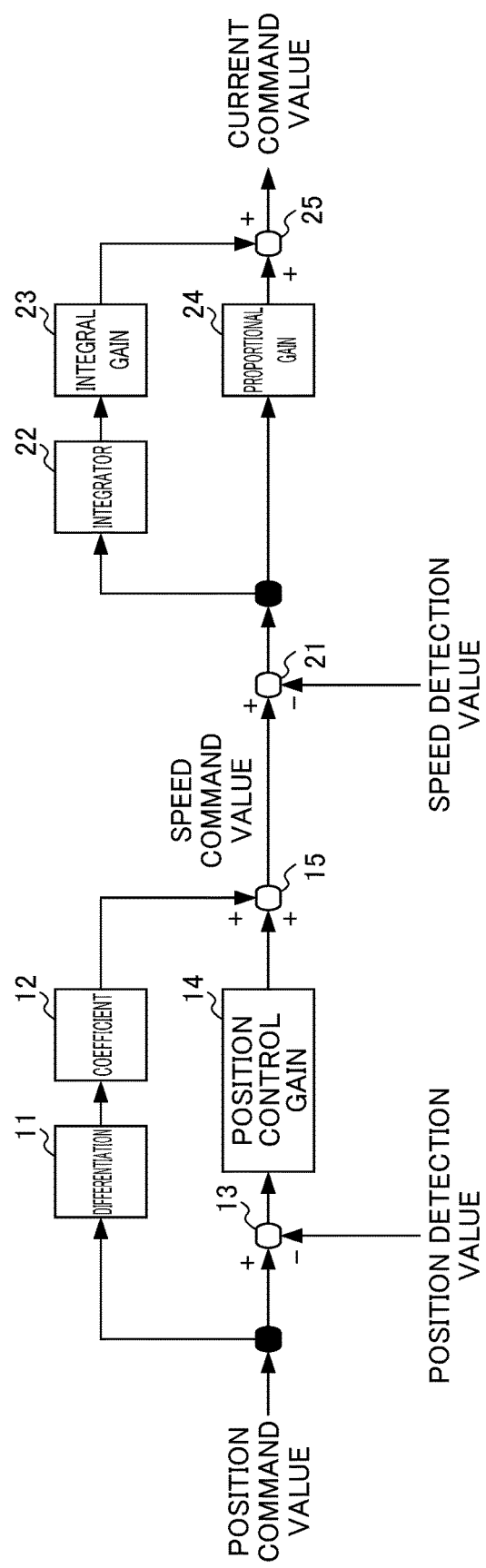
FIG. 10 is a block diagram illustrating a configuration of a servo control apparatus of a first premise technology.

FIG. 10 is a block diagram illustrating a configuration of a servo control apparatus of the first premise technology. In FIG. 10, a position command value for a servo motor serving as a controlled object is input into a subtractor 13 and a differentiator 11. The position command value is differentiated by way of the differentiator 11, and is multiplied by a coefficient by way of a coefficient multiplier 12. Further, a difference between the position command value and a position detection value from the servo motor is calculated by way of the subtractor 13. The difference between the position command value and the position detection value is input into a position control gain 14. The differentiator 11 and the coefficient multiplier 12 serve as a feedforward term creation unit which creates a feedforward term of the speed command value. The position control gain 14 serves as a feedback term creation unit which creates a feedback term of the speed command value for the servo motor.

The speed command value for the servo motor is calculated by way of an adder 15 that adds a value which is output from the position control gain 14 (the value serving as a feedback term) and a value which is output from the coefficient multiplier 12 (the value serving as a feedforward term). In other words, the speed command value is a sum of the feedback term and the feedforward term. The differentiator 11, the coefficient multiplier 12, the subtractor 13, the position control gain 14 and the adder 15 compose a position control loop.

A difference between the speed command value and the speed detection value from the servo motor is calculated by way of a subtractor 21; and the difference is input into an integrator 22 and a proportional gain 24, respectively. The integrator 22 integrates the difference between the speed command value and the speed detection value; and an integral gain 23 multiplies an integral value output from the integrator 22 by a coefficient. The proportional gain 24 multiplies the difference between the speed command value and the speed detection value by a coefficient. An adder 25 adds an output value of the integral gain 23 and an output value of the proportional gain 43; and an additional value thereof serves as a current command value for the servo motor. An electric current as instructed by the current command value is applied to the servo motor and controls the servo motor. The subtractor 21, the integrator 22, the integral gain 23, the proportional gain 24 and the adder 25 compose a speed control loop.

Second Premise Technology

Figure 11:
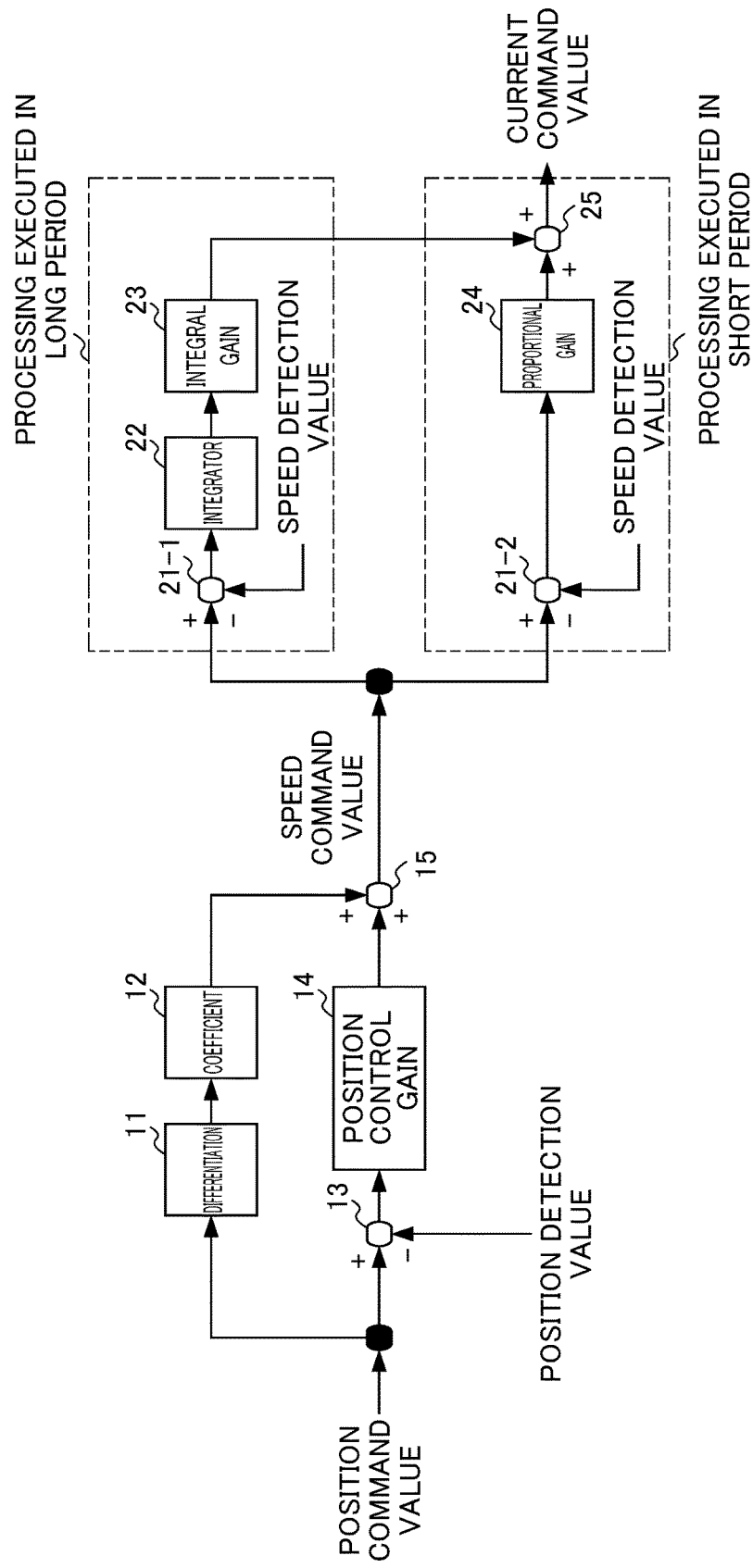
FIG. 11 is a block diagram illustrating a configuration of a servo control apparatus of a second premise technology.

FIG. 11 is a block diagram illustrating a configuration of a servo control apparatus of the second premise technology. The servo control apparatus illustrated in FIG. 11 includes two subtractors (a first subtractor 21-1 and a second subtractor 21-2) for calculating a difference between the speed command value and the speed detection value. This is a difference from the servo control apparatus of the first premise technology illustrated in FIG. 10. The first subtractor 21-1, the integrator 22 and the integral gain 23 compose a region (serving as an integral term creation unit), in which the processing is executed in a first period. The second subtractor 21-2 and the proportional gain 24 compose a region (serving as a proportional term creation unit), in which processing is executed in a second period that is shorter than the first period. The calculation period calculated by way of the proportional term creation unit is shorter than the calculation period calculated by way of the integral term creation unit.

In the servo control apparatus for controlling the servo motor, the current control using the current command value is ordinarily processed faster in speed than the position control loop for creating the speed command value. The speed control loop for creating the current command value from the speed command value and the speed detection value has the integral term creation unit and the proportional term creation unit. An oscillation limit of the speed control loop is determined by a delay time; and the delay time is a time from capturing a speed detection value until outputting a current command value.

In order to shorten the delay time, the period for executing the speed control loop is required to be shortened. However, in order to shorten the period, the processor for executing the control is required to have a high computational performance.

In general, the integral term creation unit is slower in responsiveness than the proportional term creation unit. Therefore, the servo control apparatus according to the second premise technology only calculates a proportional term having higher responsiveness in a short period, whereby achieving high responsiveness, while suppressing increase in the processing time.

The first and second premise technologies have been described above; however, the second premise technology leaves room for improvement. The period for processing the proportional term by way of the second subtractor 21-2 and the proportional gain 24 differs from the period for updating the speed command value; therefore, the current command value is largest immediately after changing the speed command value when the speed deviation is greatest, and will diminish until the next speed command value is changed.

Therefore, the current command value oscillates depending on the update period of the speed command value. This oscillation functions, for example, as a disturbance of 500 Hz when the speed command value is updated in 2 ms, a disturbance of 1 kHz when the speed command value is updated in 1 ms, and a disturbance of 2 kHz when the speed command value is updated in 0.5 ms.

Such oscillations of the current command value depending on the update period of the speed command value can be improved by the constitution of the present invention, in which the speed command value is internally divided by a period of the proportional term.

Embodiments of the present invention are hereinafter described with reference to the drawings. In the description of each embodiment, the first and second detection values are obtained from the control target. A first command value and a first detection value are the same type of values; and when the control target is a servo motor, for example, the first command value is a speed command value, and the first detection value is a speed detection value. A third command value and a second detection value are the same type of values; and when the control target is a servo motor, for example, the third command value is a position command value, and the second detection value is a position detection value. When the control target is a servo motor, for example, the second command value is a current command value. The servo motor is controlled by applying an electric current as instructed by the current command value to the servo motor.

First Embodiment

The servo control apparatus of the present embodiment includes an internal division processing unit for internally dividing the first command value by a period of the proportional term. Note that the internal division processing unit preferably divides the quantity, which has been changed in an update period of the first command value, by a calculation period calculated by way of the proportional term creation unit.

Figure 1:
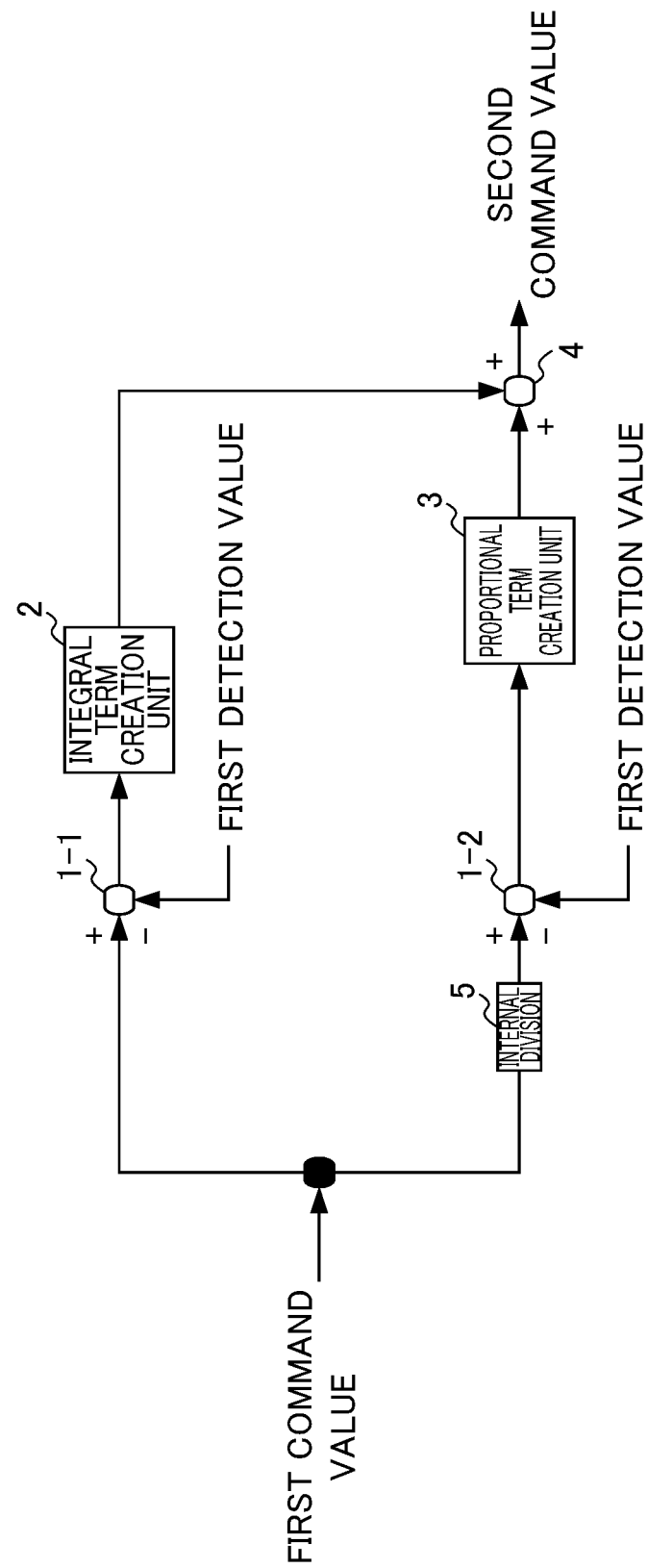
FIG. 1 is a block diagram illustrating a servo control apparatus of a first embodiment according to the present invention.

FIG. 1 is a block diagram illustrating a servo control apparatus of a first embodiment according to the present invention. As illustrated in FIG. 1, the servo control apparatus of the present embodiment includes a subtractor 1-1, a subtractor 1-2, an integral term creation unit 2, a proportional term creation unit 3, an adder 4, and an internal division processing unit 5. The subtractor 1-1 corresponds to a first subtractor, the subtractor 1-2 corresponds to a second subtractor, and the adder 4 corresponds to a first adder. The integral term creation unit 2 creates an integral term by integrating and multiplying an input by a coefficient; and the proportional term creation unit 3 creates a proportional term by multiplying the input by a coefficient.

Figure 2B:
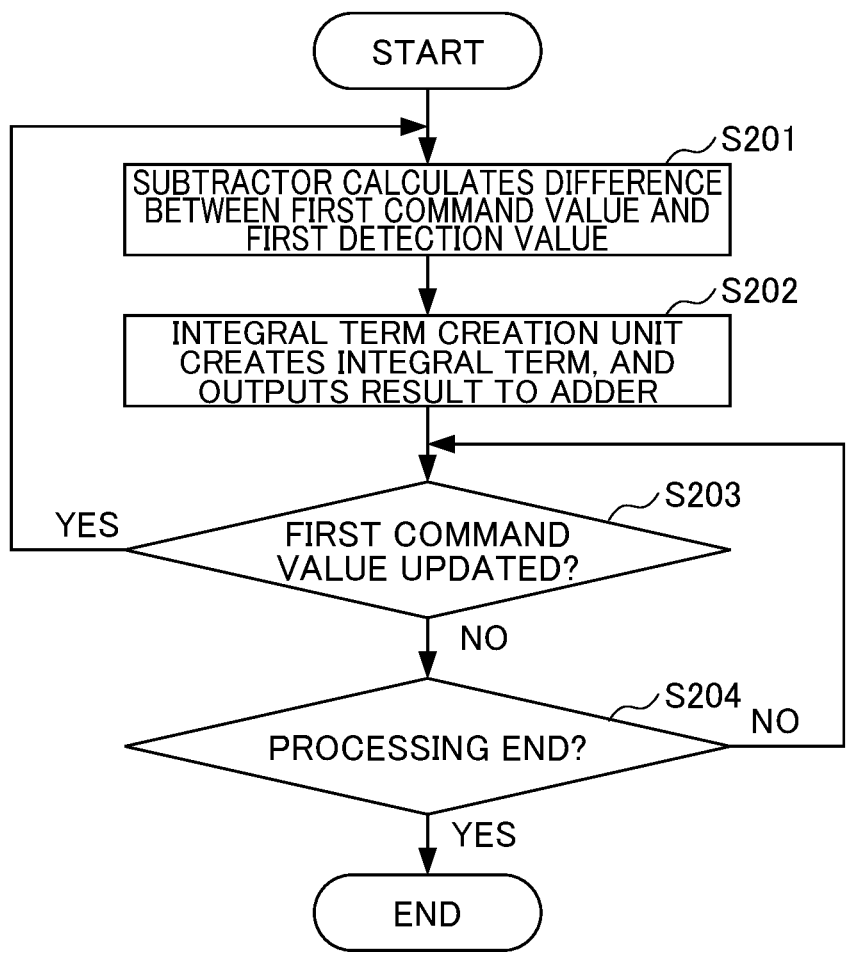
FIG. 2B is a flowchart illustrating an operation of the servo control apparatus of the first embodiment.

FIG. 2A is a flowchart illustrating the operations of the internal division processing unit 5, the subtractor 1-2, the proportional term creation unit 3 and the adder 4; and FIG. 2B is a flowchart illustrating the operations of the subtractor 1-1 and the integral term creation unit 2. When the first command value is input into the subtractor 1-1 and the internal division processing unit 5, the processing in the flowchart illustrated in FIGS. 2A and 2B starts.

When the first command value for the control target is input into the internal division processing unit 5, the internal division processing unit 5 internally divides the first command value by a period of the proportional term creation unit 3 (Step S101). A difference between the output of the internal division processing unit 5 and the first detection value from the control target is calculated by way of the subtractor 1-2 (Step S102); and the difference is input into the proportional term creation unit 3. The proportional term creation unit 3 creates a proportional term, and outputs the proportional term to the adder 4 (Step S103). The adder 4 adds the output value of the integral term creation unit 2 and the output value of the proportional term creation unit 3, and outputs an additional value thereof as the second command value for controlling the control target (Step S104). Subsequently, the processing determines whether the first command value is updated (Step S105); if the first command value is updated, the processing returns to Step S102; and if the first command value is not updated, and the processing does not end (NO in Step S106), the processing returns to Step S105.

Further, when the first command value for the control target is input into the internal division processing unit 5 and the subtractor 1-1 at the same time, a difference between the first command value and the first detection value is calculated by way of the subtractor 1-1 (Step S201), and the difference is input into the integral term creation unit 2. The integral term creation unit 2 creates an integral term, and outputs the integral term to the adder 4 (Step S202). The adder 4 executes the processing in Step S104 described above. Subsequently, the processing determines whether the first command value is updated (Step S203); if the first command value is updated, the processing returns to Step S201; and if the first command value is not updated, and the processing does not end (NO in Step S204), the processing returns to Step S203. Note that the first command value is updated at the same time in the flowcharts of FIGS. 2A and 2B described above.

The internal division processing unit 5 is only involved with the first command value used for creating the proportional term. In this manner, the internal division processing unit 5 internally divides the first command value by a period of the proportional term, whereby the oscillations of the first command value diminish. Further, since the first command value is internally divided by a period of the proportional term, the frequency rises, and the control target is less likely to respond to oscillations.

Figure 3A:
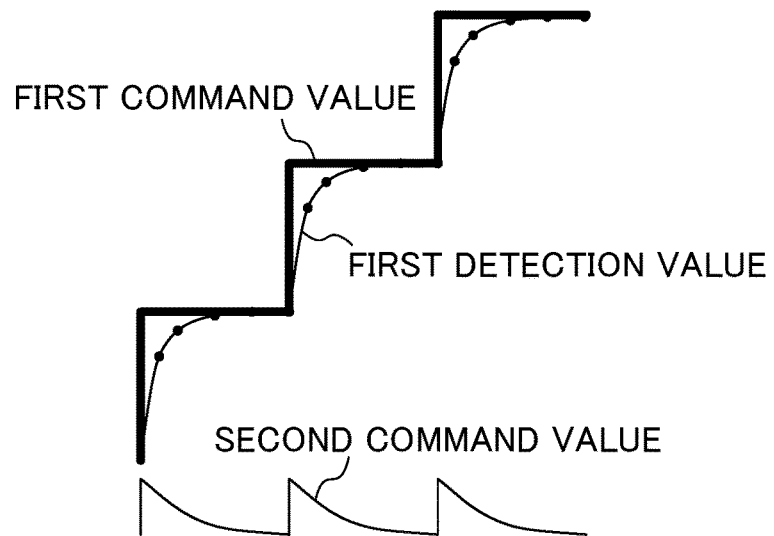
FIG. 3A is a flowchart illustrating effects achieved by the servo control apparatus of the first embodiment.
Figure 3B:
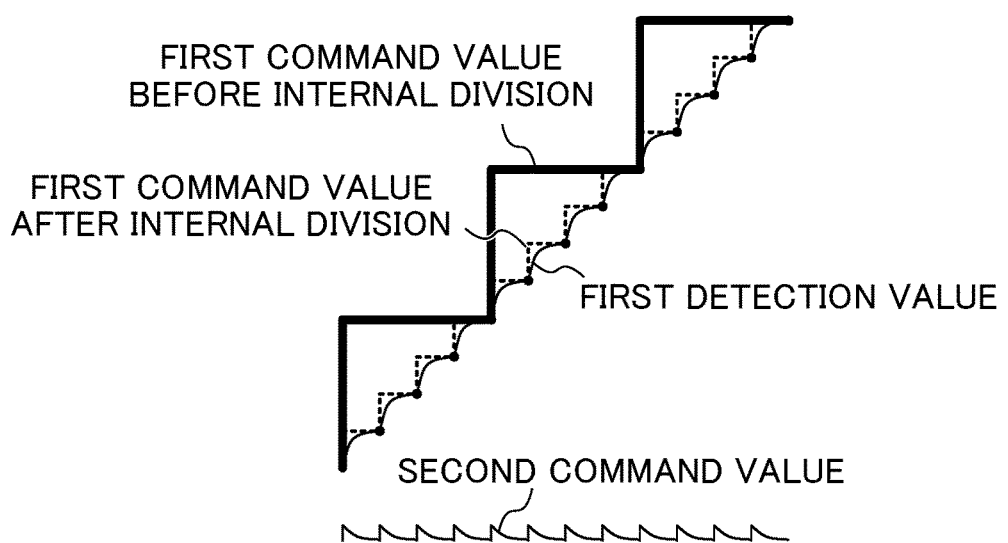
FIG. 3B is a flowchart illustrating effects achieved by the servo control apparatus of the first embodiment.

FIG. 3A illustrates an aspect, in which an internal division processing unit is not provided to the servo control apparatus, and the second command value significantly oscillates in an update period of the first command value. FIG. 3B illustrates an aspect, in which the internal division processing unit is provided to the servo control apparatus, whereby the first command value is internally divided by a period of the proportional term, the vibrational amplitude of the second command value diminishes, and the period is shortened as well.

Second Embodiment

Figure 4:
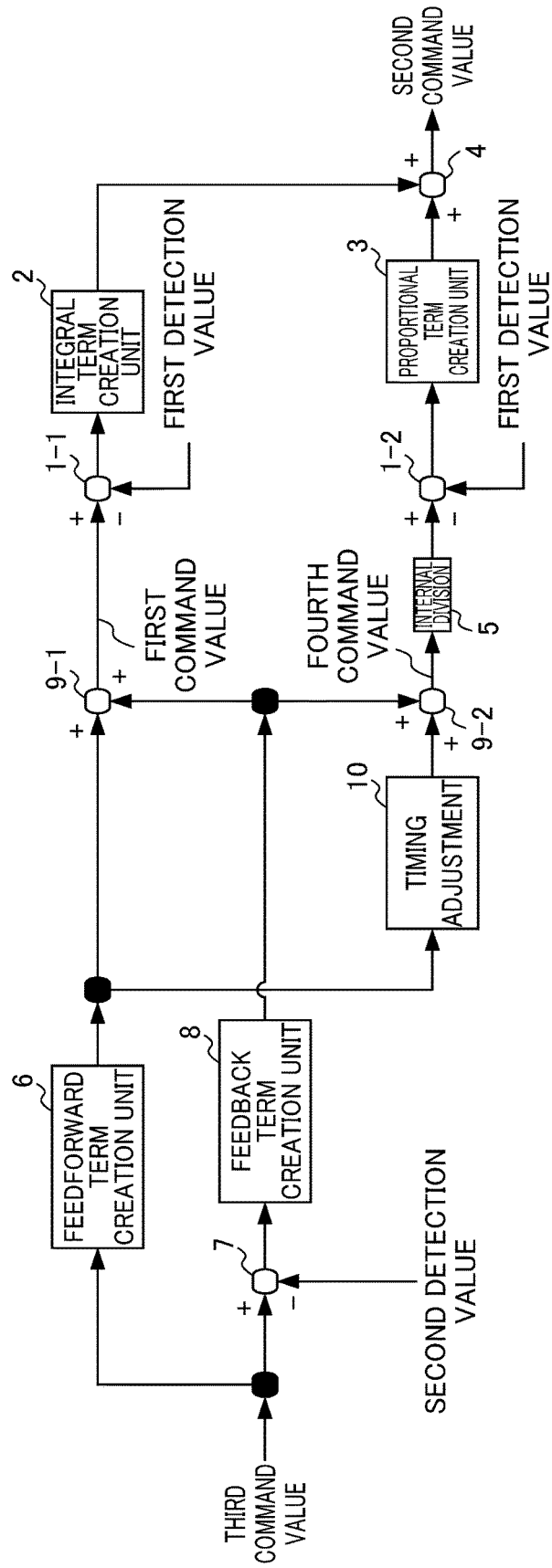
FIG. 4 is a block diagram illustrating a servo control apparatus of a second embodiment according to the present invention.

FIG. 4 is a block diagram illustrating a servo control apparatus of a second embodiment according to the present invention. As illustrated in FIG. 4, in addition to the configuration of the servo control apparatus of the first embodiment illustrated in FIG. 1, the servo control apparatus of the present embodiment includes a subtractor 7, a feedforward term creation unit 6, a feedback term creation unit 8, adders 9-1 and 9-2, and a timing adjustment unit 10. The same reference numbers are assigned to the same units as those of the servo control apparatus of FIG. 1.

In the servo control apparatus of the first embodiment, the internal division processing unit divides an increment of the first command value by time; however, this internal division processing generates a delay in the second command value.

The time of the integral term and the proportional term, which are calculated from the feedback on the first detection value, cannot be advanced; however, the time of the feedforward term, which is created from the third command value for controlling the control target, can be advanced, since a third command value in the future can be prefetched and known by way of a processing program. The servo control apparatus of the present embodiment includes a timing adjustment unit 10, such that the proportional term processed at a high speed is not delayed. The timing adjustment unit 10 adjusts the timing of the feedforward term, in consideration of a delay in the internal division processing unit.

The third command value for controlling the control target is input into the feedforward term creation unit 6 and the subtractor 7. The subtractor 7 calculates a difference between the third command value and the second detection value from the control target, and inputs the difference into the feedback term creation unit 8. The first command value to be input into the subtractor 1-1 is created by adding the output (feedforward term) of the feedforward term creation unit 6 and the output (feedback term) of the feedback term creation unit 8 by way of the adder 9-1. On the other hand, a fourth command value to be input into the internal division processing unit 5 is created by adjusting the output of the feedforward term creation unit 6 by way of the timing adjustment unit 10, and adding the output of the timing adjustment unit 10 and the output of the feedback term creation unit 8 by way of the adder 9-2. The fourth command value serves as a timing-adjusted first command value.

Figure 5:
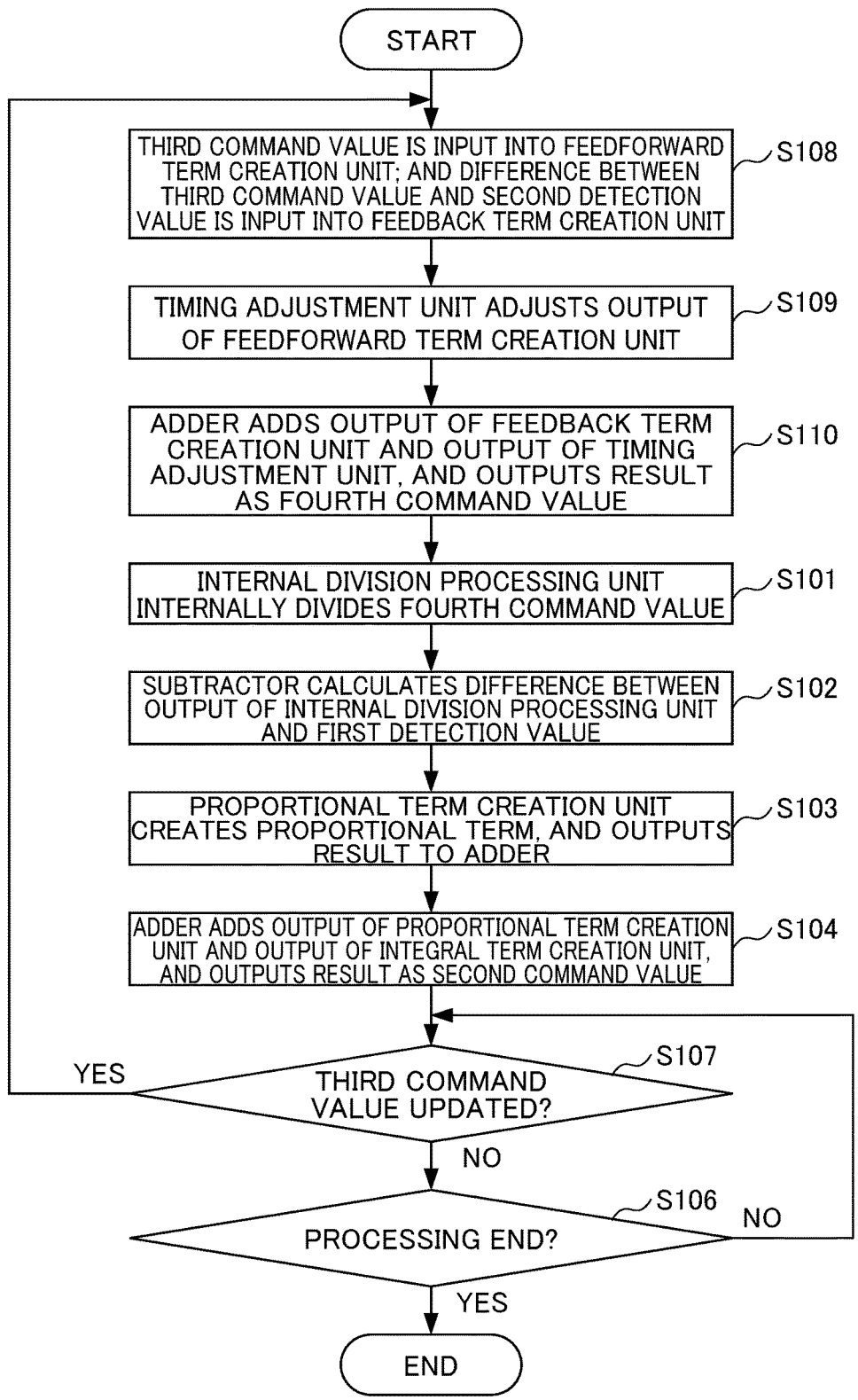
FIG. 5 is a flowchart illustrating an operation of the servo control apparatus of the second embodiment.

FIG. 5 is a flowchart illustrating the operations of the feedforward term creation unit 6, the feedback term creation unit 8, the timing adjustment unit 10, the adder 9-2, the internal division processing unit 5, the subtractor 1-2, the proportional term creation unit 3 and the adder 4. FIG. 6 is a flowchart illustrating the operations of feedforward term creation unit 6, the feedback term creation unit 8, the adder 9-1, the subtractor 1-1 and the integral term creation unit 2. When the third command value is input into the subtractor 7 and the feedforward term creation unit 6, the processing in the flowchart illustrated in FIGS. 5 and 6 starts. Note that the same reference numbers are assigned to Steps S101 to S104 in FIG. 5 and Steps S101 to S104 in FIG. 2A, which are the same except that the first command value is replaced with the fourth command value in FIG. 5.

As illustrated in FIG. 5, the third command value for the control target is input into the feedforward term creation unit 6 and the subtractor 7 (Step S108), a feedforward term is created by way of the feedforward term creation unit 6, and the timing adjustment unit 10 adjusts the timing of output of the feedforward term creation unit 6 (Step S109). The subtractor 7 calculates a difference between the third command value and the second detection value from the control target, and inputs the difference into the feedback term creation unit 8. The adder 9-2 adds the output of the timing adjustment unit 10 and the output of the feedback term creation unit 8, and outputs an additional value thereof as the fourth command value. When the fourth command value is input into the internal division processing unit 5, the internal division processing unit 5 internally divides the fourth command value by a period of the proportional term creation unit 3 (Step S101). A difference between the output of the internal division processing unit 5 and the first detection value from the control target is calculated by way of the subtractor 1-2 (Step S102); and the difference is input into the proportional term creation unit 3. The proportional term creation unit 3 creates a proportional term, and outputs the proportional term to the adder 4 (Step S103). The adder 4 adds the output value of the integral term creation unit 2 and the output value of the proportional term creation unit 3, and outputs an additional value thereof as the second command value for controlling the control target (Step S104). Subsequently, the processing determines whether the third command value is updated (Step S107); if the third command value is updated, the processing returns to Step S108; and if the third command value is not updated, and the processing does not end (NO in Step S106), the processing returns to Step S107.

Further, as illustrated in FIG. 6, the third command value for the control target is input into the feedforward term creation unit 6 and the subtractor 7 (Step S206); and the subtractor 7 calculates a difference between the third command value and the second detection value from the control target, and inputs the difference into the feedback term creation unit 8. The adder 9-1 adds the output of the feedforward term creation unit 6 and the output of the feedback term creation unit 8, and outputs an additional value thereof as the first command value. When the first command value for the control target is input into the subtractor 1-1, a difference between the first command value and the first detection value is calculated by way of the subtractor 1-1 (Step S201), and the difference is input into the integral term creation unit 2. The integral term creation unit 2 creates an integral term, and outputs the integral term to the adder 4 (Step S202). The adder 4 executes the processing in Step S104 described above. Subsequently, the processing determines whether the third command value is updated (Step S205); if the third command value is updated, the processing returns to Step S206; and if the third command value is not updated, and the processing does not end (NO in Step S204), the processing returns to Step S205. Note that the third command value is updated at the same time, in the flowcharts of FIGS. 5 and 6 described above.

Figure 7A:
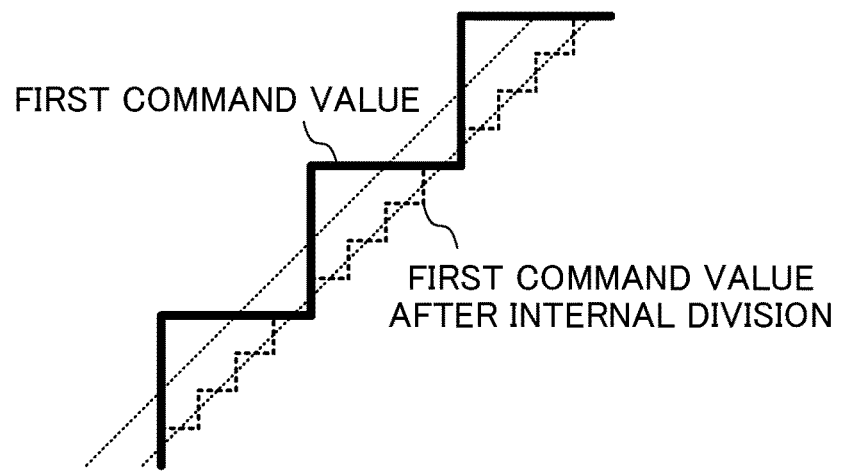
FIG. 7A is a flowchart illustrating effects achieved by the servo control apparatus of the second embodiment.
Figure 7B:
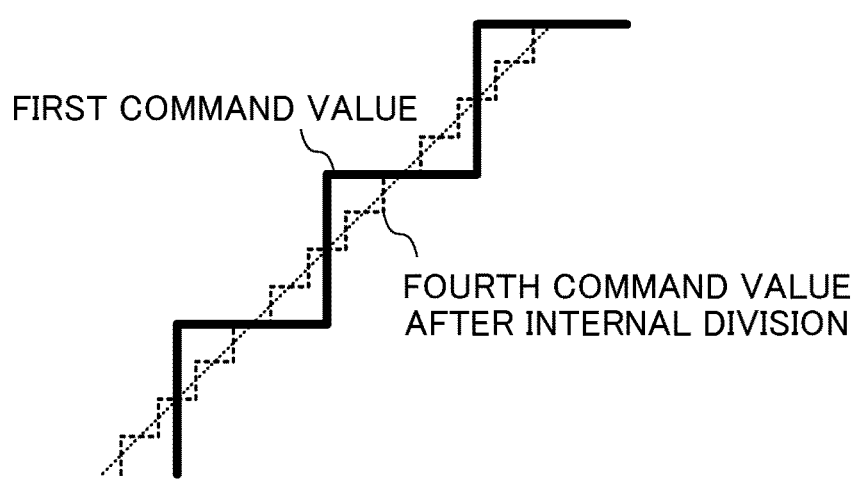
FIG. 7B is a flowchart illustrating effects achieved by the servo control apparatus of the second embodiment.

FIG. 7A illustrates the timing between the first command value without timing adjustment and the first command value after internal division, similar to the servo control apparatus of FIG. 1. FIG. 7B illustrates the timing between the first command value without timing adjustment, and the fourth command value after internally dividing the timing-adjusted fourth command value. The timing adjustment unit advances the time, whereby a delay in the internal division processing unit can be dissolved.

EXAMPLES

Examples of the present invention are hereinafter described.

First Example

A servo control apparatus of the present example is implemented by using the servo control apparatus illustrated for FIG. 1, and includes a filter as the internal division processing unit for internally dividing the first command value by a period of the proportional term.

Figure 8:
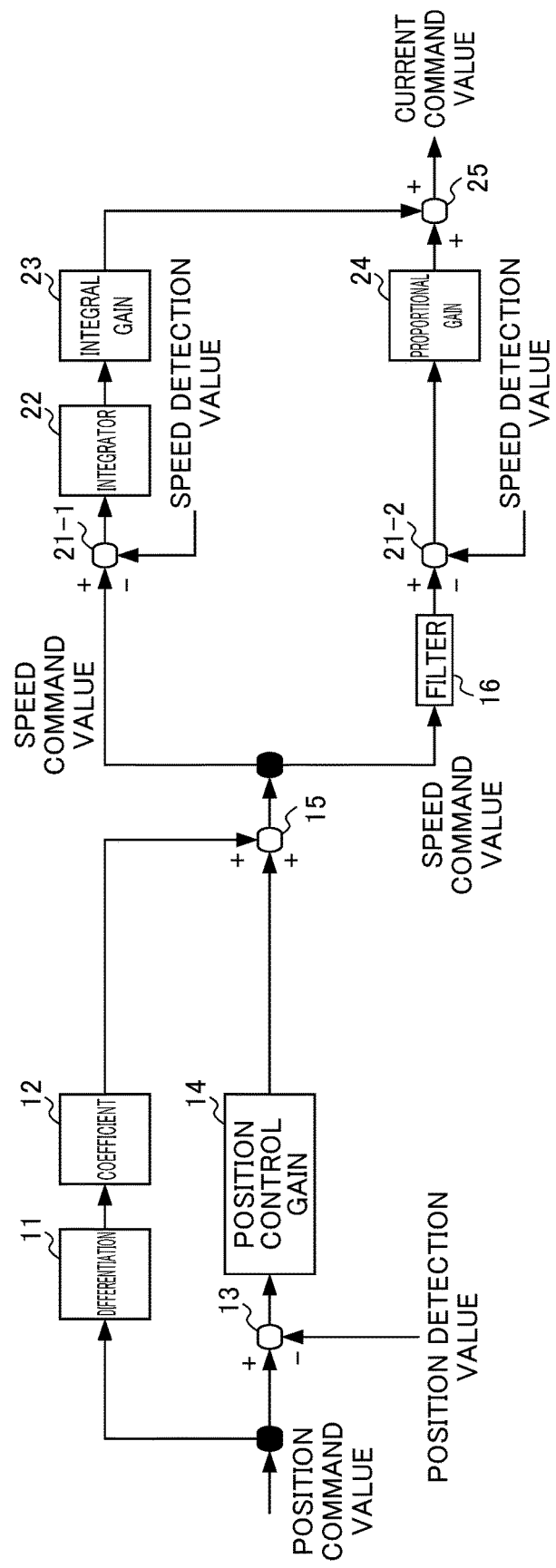
FIG. 8 is a block diagram illustrating a servo control apparatus of a first example according to the present invention.

FIG. 8 is a block diagram illustrating the servo control apparatus of the first example according to the present invention. The present example is configured by adding a filter 16 to the servo control apparatus of the second premise technology illustrated in FIG. 11; and the filter 16 internally divides the speed command value by a period of the proportional term. The filter 16 is only involved with the speed command value used for creating the proportional term. In this manner, the filter 16 internally divides the speed command value by a period of the proportional term, whereby the oscillations of the speed command value diminish, and a machine is less likely to shake. Further, since the frequency rises, the machine is less likely to respond to oscillations. The oscillations of the speed command value diminish, and the frequency rises, both of which serve as a factor influencing the machine against shaking.

The subtractors 21-1 and 21-2 of the present example correspond to the subtractors 1-1 and 1-2 of the servo control apparatus of FIG. 1; the integrator 22 and the integral gain 23 correspond to the integral term creation unit 2 of the servo control apparatus of FIG. 1; and the proportional gain 24 corresponds to the proportional term creation unit 3 of the servo control apparatus of FIG. 1. The speed command value, the speed detection value, and the current detection value correspond to the first command value, the first detection value, and the second command value of the servo control apparatus of FIG. 1.

The servo control apparatus of the present example can achieve the same effects as those achieved by the servo control apparatus illustrated in FIG. 1. Namely, in order to enhance the responsiveness with a smaller number of computation processes, the servo control apparatus of the present example updates the proportional term of the speed control loop in a period shorter than the integral term, and interpolates the speed command value in an update period of the proportional term, thereby being able to reduce the oscillations of the current command value in the update period.

Second Example

Figure 9:
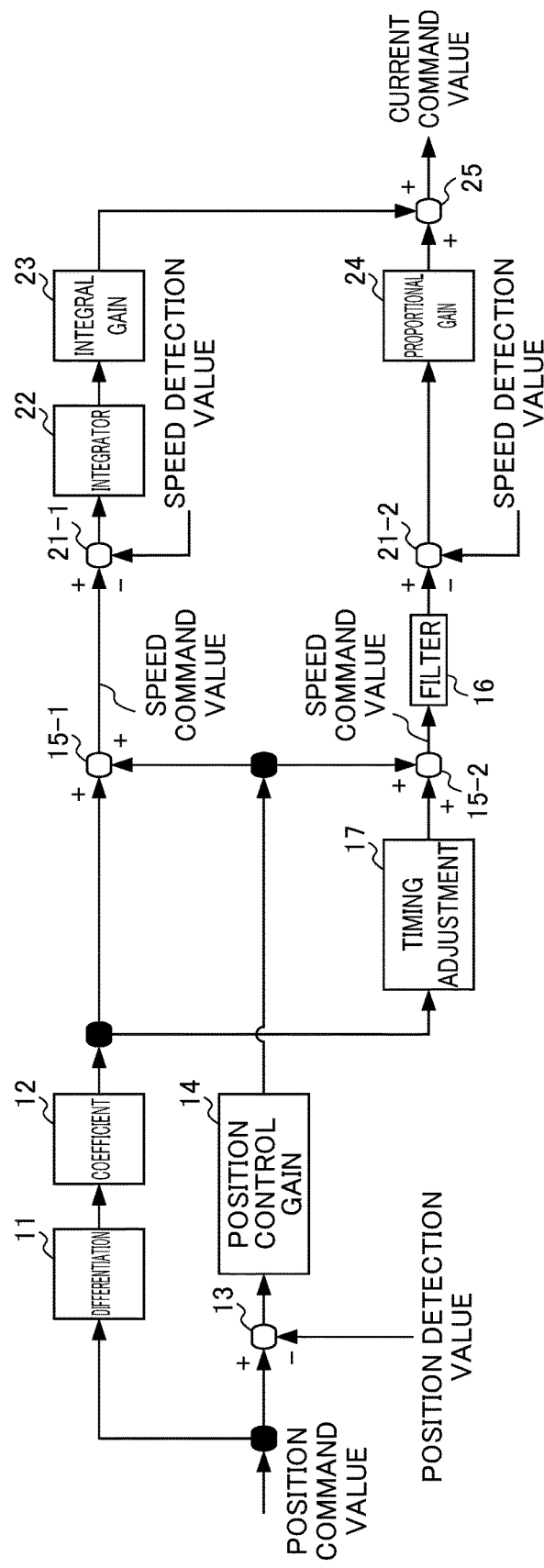
FIG. 9 is a block diagram illustrating a servo control apparatus of a second example according to the present invention.

FIG. 9 is a block diagram illustrating a servo control apparatus of a second example according to the present invention. The servo control apparatus of the present example corresponds to the servo control apparatus of the second embodiment illustrated in FIG. 4; and the servo control apparatus of the present example includes adders 15-1 and 15-2 provided instead of the adder 15, and a timing adjustment unit 17, in addition to the configuration of the servo control apparatus of the first example illustrated in FIG. 8. The same reference numbers are assigned to the same units as those of the servo control apparatus of FIG. 8.

The position command value is input into the differentiator 11 and the subtractor 13. The subtractor 13 calculates a difference between the position command value and the position detection value from the servo motor, and inputs the difference into the position control gain 14. The differentiator 11 differentiates the position command value; and the coefficient multiplier 12 multiplies a differential value thereof by a coefficient.

The speed command value to be input into the subtractor 21-1 is created by adding the output of the coefficient multiplier 12 and the output of the position control gain 14 by way of the adder 15-1. On the other hand, the speed command value to be input into the filter 16 is created by adding the output of the timing adjustment unit 10 and the output of the position control gain 14 by way of the adder 15-2. The timing adjustment unit 17 adjusts the timing of the output of the coefficient multiplier 12.

The differentiator 11 and the coefficient multiplier 12 of the present embodiment correspond to the feedforward term creation unit 6 of the servo control apparatus of FIG. 4; and the position control gain 14 corresponds to the feedback term creation unit 8 of the servo control apparatus of FIG. 4. Further, the timing adjustment unit 17 corresponds to the timing adjustment unit 10 of the servo control apparatus of FIG. 4; and the filter 16 corresponds to the internal division processing unit 5 of the servo control apparatus of FIG. 4. The position command value, the position detection value, the speed command value, the speed detection value, and the current detection value correspond to the third command value, the second detection value, the first and fourth command values (serving as the first timing-adjusted command value), the first detection value, and the second command value of the servo control apparatus of FIG. 4, respectively.

The servo control apparatus of the present example can achieve the same effects as those achieved by the servo control apparatus illustrated in FIG. 4. Namely, the servo control apparatus of the first example divides an increment of the speed command by time by using the filter; however, the internal division processing by way of the filter may generate a delay in the current command value. In the servo control apparatus of the present example, the timing adjustment unit advances the timing of the feedforward term in consideration of a delay in the filter, thereby being able to dissolve the delay in the filter.

All or part of the servo control apparatus of the embodiments and examples described above can be implemented by hardware, software or a combination thereof. Herein, the implementation by software means implementation by a computer that reads and executes a program. When configured with hardware, part or all of the servo control apparatus illustrated in FIG. 1, the embodiment of FIG. 4, and the example of FIGS. 8 and 9 can be configured with, for example, an integrated circuit (IC) such as LSI (Large Scale Integrated Circuit), ASIC (Application Specific Integrated Circuit), gate array, and FPGA (Field Programmable Gate Array).

In the case in which all or part of the servo control apparatus is configured with software, a computer is configured with: a storage unit such as a hard disk and ROM which store a program describing all or part of the operations of the servo control apparatus illustrated in the flowcharts of FIGS. 2A, 2B, 5 and 6; DRAM which store data necessary for computation; CPU; and a bus which connects each unit; in which information necessary for computation is stored in the DRAM, and the program is operated in the CPU, whereby all or part of the functions can be realized. In this case, the processing in FIGS. 2A and 2B and the processing in FIGS. 5 and 6 are parallelized, and can be processed with a computer including a multiprocessor or multi-core processor.

A program is stored by using various types of computer-readable media, and can be supplied to a computer. The computer-readable media include various types of tangible storage media. The computer-readable media include a non-transitory computer-readable medium. Examples of the computer-readable media include: a magnetic recording medium (e.g. flexible disk, magnetic tape, hard disk drive), a magneto-optical recording medium (e.g. magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)).

The embodiments and examples of the present invention have been described above; however, the present invention is not limited to the above-described embodiments and examples; a person skilled in the art in view of disclosures in the claims can modify or alter the present invention into various aspects without departing from the scope of the present invention; and such modifications and alterations are also encompassed by the scope of the rights of the present invention.

EXPLANATION OF REFERENCE NUMERALS 1-1, 1-2, 7, 13, 21, 21-1, 21-2 subtractor
2 integral term creation unit
3 proportional term creation unit
4, 9-1, 9-2, 15, 15-1, 15-2, 25 adder
5 internal division processing unit
6 feedforward term creation unit
8 feedback term creation unit
11 differentiator
12 coefficient multiplier
14 position control gain
22 integrator
23 integral gain
24 proportional gain

What is claimed is:

1. A servo control apparatus, comprising:
a first subtractor configured to calculate a difference between a first command value being a periodic signal for controlling a servo motor, and a first detection value from the servo motor;
an integral term creation unit configured to create an integral term by integrating an output of the first subtractor, and multiplying an integral value thereof by a first coefficient;
an internal division processing unit configured to internally divide the first command value by a predetermined period;
a second subtractor configured to calculate a difference between an output of the internal division processing unit and the first detection value;
a proportional term creation unit configured to create a proportional term by multiplying an output of the second subtractor by a second coefficient; and
a first adder configured to add an output of the integral term creation unit and an output of the proportional term creation unit, and configured to output an additional value thereof as a second command value for controlling the servo motor,
wherein a calculation period calculated by way of the proportional term creation unit is shorter than a calculation period calculated by way of the integral term creation unit.

2. The servo control apparatus according to claim 1, wherein the internal division processing unit divides a quantity, which has been changed in an update period of the first command value, by a calculation period calculated by way of the proportional term creation unit.

3. The servo control apparatus according to claim 1, further comprising:
a feedforward term creation unit configured to create a feedforward term by differentiating a third command value for controlling the servo motor, and multiplying a differential value thereof by a third coefficient;
a third subtractor configured to calculate a difference between the third command value and a second detection value from the servo motor;
a feedback term creation unit configured to create a feedback term from an output of the third subtractor;
a timing adjustment unit configured to adjust timing of an output of the feedforward term creation unit;
a second adder configured to add an output of the feedforward term creation unit and an output of the feedback term creation unit, and configured to output an additional value thereof as the first command value to the first subtractor; and
a third adder configured to add an output of the timing adjustment unit and an output of the feedback term creation unit, and configured to output an additional value thereof as the first command value being timing-adjusted to the internal division processing unit.

4. The servo control apparatus according to claim 3, wherein the timing adjustment unit advances timing by a quantity of delay in the internal division processing unit.

5. The servo control apparatus according to claim 3, wherein the first command value and the first command value being timing-adjusted are speed command values, the first detection value is a speed detection value, the second command value is a current command value, the third command value is a position command value, and the second detection value is a position detection value.

6. A servo control method for a servo control apparatus, the method comprising:
   calculating a first difference between a first command value being a periodic signal for controlling a servo motor, and a first detection value from the servo motor;
   creating an integral term by integrating the first difference, and multiplying an integral value thereof by a first coefficient;
   internally dividing the first command value by a predetermined period;
   calculating a second difference between the value internally divided and the first detection value;
   creating a proportional term by multiplying the second difference by a second coefficient; and
   adding the integral term and the proportional term, and outputting an additional value thereof as a second command value for controlling the servo motor,
   wherein a calculation period for calculating the proportional term is shorter than a calculation period for calculating the integral term.

7. The servo control method according to claim 6, further comprising:
   creating a feedforward term by differentiating a third command value for controlling the servo motor, and multiplying a differential value thereof by a third coefficient;
   calculating a third difference between the third command value and a second detection value from the servo motor;
   creating a feedback term from the third difference;
   adjusting timing of the feedforward term;
   adding the feedforward term and the feedback term, and outputting an additional value thereof as the first command value; and
   adding the feedforward term being timing-adjusted and the feedback term, and outputting an additional value thereof as the first command value being timing-adjusted.

8. A non-transitory computer-readable medium storing a servo control program thereon, causing a computer as a servo control apparatus to execute the processing of:
   calculating a first difference between a first command value being a periodic signal for controlling a servo motor, and a first detection value from the servo motor;
   creating an integral term by integrating the first difference, and multiplying an integral value thereof by a first coefficient;
   internally dividing the first command value by a predetermined period;
   calculating a second difference between the value internally divided and the first detection value;
   creating a proportional term by multiplying the second difference by a second coefficient; and
   adding the integral term and the proportional term, and outputting an additional value thereof as a second command value for controlling the servo motor,
   wherein a calculation period for calculating the proportional term is shorter than a calculation period for calculating the integral term.

* * * * *